(12) United States Patent
Randjelovic et al.

(10) Patent No.: US 7,764,175 B2
(45) Date of Patent: Jul. 27, 2010

(54) METHOD OF VERIFYING THE PROPER WORKING OF A TRANSPONDER MOUNTED ON A VEHICLE WHEEL

(75) Inventors: Zoran Randjelovic, Marin (CH); Arthur Descombes, Kerzers (CH); Marc Degrauwe, Chez-le-Bart (CH)

(73) Assignee: EM Microelectronic-Marin S.A., Marin (CH)

( * ) Notice: Subject to any disclaimer, the term of this patent is extended or adjusted under 35 U.S.C. 154(b) by 274 days.

(21) Appl. No.: 11/857,798

(22) Filed: Sep. 19, 2007

(65) Prior Publication Data

US 2008/0068188 A1  Mar. 20, 2008

(30) Foreign Application Priority Data

Sep. 19, 2006  (EP)  .................................. 06120894

(51) Int. Cl.
*G08B 13/14* (2006.01)
(52) U.S. Cl. ................ 340/572.1; 340/568.1; 340/5.22; 340/457.3
(58) Field of Classification Search ... 340/572.1–572.9, 340/568.1, 445, 5.22, 442, 444, 449, 426.33, 340/453, 457.3
See application file for complete search history.

(56) References Cited

U.S. PATENT DOCUMENTS

| 5,540,092 | A | 7/1996 | Handfield et al. | |
| 6,885,296 | B2* | 4/2005 | Hardman et al. | 340/505 |
| 7,260,371 | B1* | 8/2007 | Yones | 455/186.1 |
| 7,278,694 | B2* | 10/2007 | Choi et al. | 303/156 |
| 7,375,626 | B2* | 5/2008 | Ening | 340/447 |
| 2003/0008692 | A1* | 1/2003 | Phelan | 455/574 |
| 2005/0110626 | A1* | 5/2005 | Nicot et al. | 340/445 |
| 2007/0013500 | A1* | 1/2007 | Forster | 340/445 |
| 2007/0182530 | A1* | 8/2007 | Pilz et al. | 340/438 |

FOREIGN PATENT DOCUMENTS

| EP | 1 388 439 A2 | 2/2004 |
| FR | 2 874 086 A1 | 2/2006 |

OTHER PUBLICATIONS

European Search Report issued in corresponding application No. EP 06 12 0894, completed Mar. 29, 2007.

* cited by examiner

*Primary Examiner*—Daniel Previl
(74) *Attorney, Agent, or Firm*—Griffin & Szipl, P.C.

(57) ABSTRACT

The invention concerns a method of verifying the proper working of a transponder mounted on a rotating mobile element of a vehicle, characterized in that it includes the steps of: a) measuring a temperature value by means of a temperature sensor connected to the transponder; b) detecting breach of a overheat threshold; c) a monitoring operation carried out by a reader arranged in the vehicle and provided for communicating with the transponder, consisting in executing a command on one of the temperature sensitive elements of the transponder; d) the reader determining the state of the transponder as a function of the response or absence of any response to the command to be executed: (i) if the response is correct, the transponder is operational; (ii) if the response is incorrect, or in the absence of any response, the transponder is not operational.

10 Claims, 2 Drawing Sheets

METHOD OF VERIFYING THE PROPER WORKING OF A TRANSPONDER MOUNTED ON A VEHICLE WHEEL

This application claims priority from European Patent Application No. 06120894.8, filed Sep. 19, 2006, the entire disclosure of which is incorporated herein by reference.

FIELD OF THE INVENTION

The present invention concerns, generally, a method of verifying the proper operation or working of a transponder after detection of the breach of a threshold, called a overheat threshold. The invention concerns more specifically the implementation of this method in an application where the transponder is mounted on a rotating wheel of a vehicle, of the automobile vehicle type.

BACKGROUND OF THE INVENTION

Pressure monitoring systems for the tyres of an automobile vehicle are known from the prior art. Such systems include a transponder mounted on a wheel, or on the rim, or directly on the tyre, associated with a pressure sensor for taking tyre pressure measurements. These systems further include a reader associated with the transponder, which allows communication with the latter, and which is generally arranged in the vehicle with the dashboard electronics. Finally, the system generally includes an indicator for warning the user of the vehicle when the pressure of one of the tyres does not conform to the required values.

Nonetheless, this type of vehicle tyre pressure monitoring system may experience some problems of reliability in particular circumstances, in particular when the tyre is overheated. Indeed, it has been observed that in particular driving conditions, for example, during an emergency stop, the tyre temperature can undergo a very significant increase and damage the transponder arranged thereon, with subsequent pressure measurements then no longer being reliable.

SUMMARY OF THE INVENTION

It is one of the main objects of the present invention to overcome the aforementioned drawbacks. The present invention therefore concerns a method of verifying the proper working of a transponder mounted on a rotating mobile element of a vehicle including the steps defined in claim 1. This verification method has in particular the advantage of diagnosing the state of the transponder following detection of the breach of a determined overheat threshold.

Advantageous implementation variants of this verification method form the subject of the dependent claims.

BRIEF DESCRIPTION OF THE DRAWINGS

Other features and advantages of the present invention will appear more clearly upon reading the following detailed description of embodiments of the invention given solely by way of non-limiting example and illustrated by the annexed drawing, in which.

DETAILED DESCRIPTION OF THE INVENTION

Figure 1:
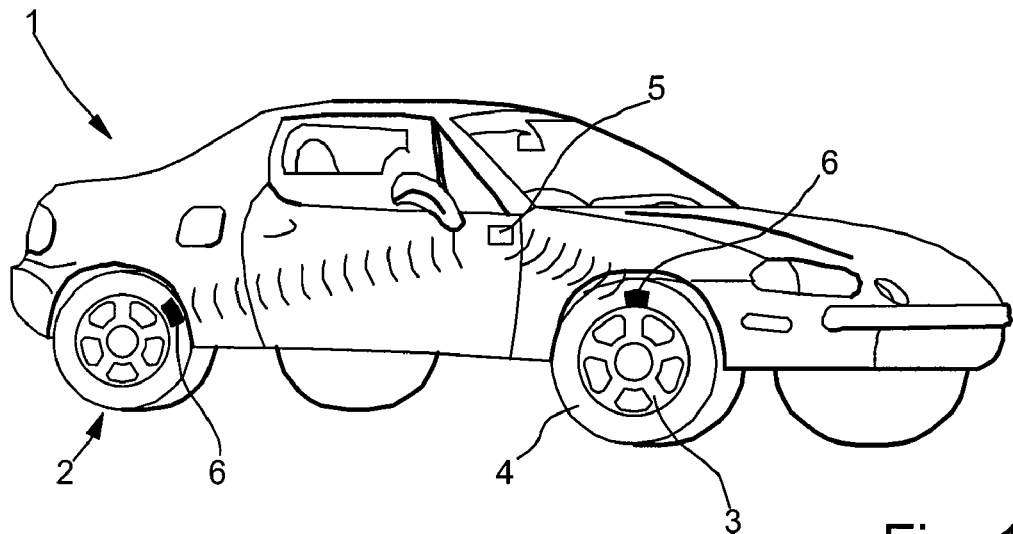
FIG. 1 is a schematic view of the implementation of a reader/transponder system in an automobile vehicle.

FIG. 1 is a schematic view of an automobile vehicle including a reader/transponder system for checking the pressure of the vehicle's tyres. It is clear that the following description remains valid for any other mobile vehicle mounted on rotating mobile elements for driving the vehicle and capable of incorporating a transponder, such as for example, a motorcycle, an aeroplane, etc. ...

According to the example shown in FIG. 1, automobile vehicle 1 is mounted on a certain number of rotating mobile elements or wheels 2 for moving the vehicle. These wheels 2 are conventionally formed of a rim 3 on which a tyre 4 is mounted, inflated to a certain pressure value. Vehicle 1 is also fitted with a reader/transponder system, reader 5 being arranged in the vehicle, for example with the dashboard computer, whereas a transponder 6 is mounted on at least one wheel 2 and preferably on each of wheels 2. Each transponder 6 can be mounted either on the rim, or directly on the tyre 4 of wheel 2. The purpose of these transponders is to provide correct information concerning the wheel to the vehicle dashboard computer via reader 5 which is especially adapted for communicating with the transponder(s), for example by radiofrequency transmission. A known function consists in verifying the pressure of tyres 4. For this purpose, each transponder 6 is provided with a pressure sensor for measuring and checking the tyre pressure. However, it is possible to envisage using such transponders 6 mounted on wheels 2 for other purposes, such as for example for checking the degree of wear of tyres 4. In such case, each transponder 6 is connected to a wear warning light.

The object of the present invention concerns more specifically a method of verifying the proper working of the transponder(s) 6 following detection of a breach of a determined overheat threshold. Thus, the reader/transponder system is adapted for implementing this method. In order to do this, each transponder 6 is provided with a temperature sensor for measuring the tyre temperature values. These temperature values are then transmitted to reader 5 for detection of the breach of a determined overheat threshold. The reader is programmed to carry out a diagnostic procedure or method of verifying the proper working of a transponder when it detects breach of the overheat threshold.

In order to better comprehend the various variants for implementing this verification method, we will briefly recall that a transponder is made up of several elements including an antenna for communicating with the reader, an internal logic for processing the commands and at least one non-volatile memory for storing data. It is possible to class all of the constituent elements of a transponder into two categories depending upon whether the elements are sensitive to temperature variations and more particularly to high temperatures. Within the scope of current technology, high temperatures are temperatures of the order of 125° C. or more, however, it will easily be understood that the threshold from which a transponder is considered to be overheated essentially depends upon the technology thereof, and may thus vary considerably depending upon the materials used. Thus, the category of elements that are not sensitive to high temperatures will include all of the elements forming the transponder logic and the antenna. The category of elements sensitive to high temperatures will include the non-volatile memory and the sensors if they are integrated in the transponder or even elements of the type of an analogue digital converter.

Figure 2:
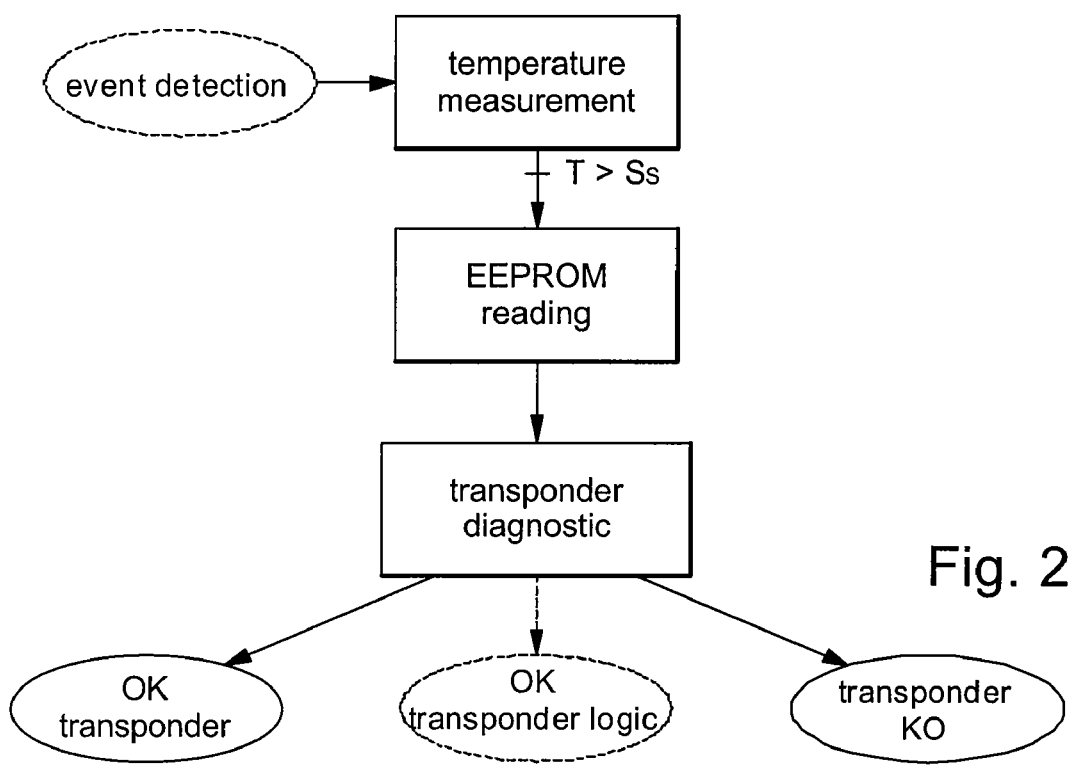
FIG. 2 is a diagram of the various steps of the transponder verification method according to a first implementation variant.

FIG. 2 is a diagram of a first implementation variant of the method of verifying the proper operation of a transponder mounted on a vehicle wheel. The first step consists in measuring the temperature on the wheel on which the transponder is mounted. In order to do this measurements are taken using a temperature sensor that is also mounted on the wheel. These temperature measurements can be taken in various ways. A first solution consists in taking periodic measurements, for example at a rate of one measurement per second. A second solution consists in monitoring the temperature variations and taking temperature measurements at a frequency depending upon the size of the variations, the greater the temperature variations, the more temperature measurements the system takes. A third advantageous solution consists in taking temperature measurements when a particular event is detected, like for example, detection of an emergency stop or even activation of the wheel anti-blocking system or of the electronic braking power divider. It is clear that all of the known alternatives presented can be combined.

The temperature measurement taken is compared to a predefined overheat threshold $S_s$, for example 125° C. If the temperature measurement is higher than the overheat threshold ($T>S_s$), the reader then undertakes a diagnostic procedure to verify whether the transponder is still operational despite the overheat experienced by the wheel on which the transponder is mounted. In order to ensure a reliable verification, it thus seems wise to verify the proper operation of one of the most sensitive elements to ensure that the whole of the transponder is working properly. In order to do this, the reader sends a command to one of the sensitive elements of the transponder, then verifies that the command is executed properly. If the command is correctly executed, the transponder is operational insofar as the elements that are not temperature sensitive are operating since they have allowed this command to be processed, but above all the element that is sensitive to high temperatures is operational since the command has been executed properly. If the command is not properly executed, the transponder is not therefore operation and the reader then knows that the information supplied by the transponder is not reliable.

Within the scope of the present invention, it was observed that the most sensitive element of the transponder capable of having undergone damage due to the breach of a overheat threshold was the non-volatile memory, i.e. the memory containing all of the information relating to the measurements taken by means of the sensors. Moreover, the non-volatile memory is easily accessible via conventional write, delete or read commands. This is why, according to an advantageous variant of the method, the reader sends a command to test whether the non-volatile memory of the transponder is working properly. In particular, cleverly, a non-volatile memory read command is executed, which prevents any potential corruption of data which could be caused by a write or delete operation carried out on the memory. Again, cleverly, this read operation is directed over a given memory storage zone, the content of which is definitely known to the reader beforehand, this is why, advantageously, for example the transponder identifier or any other data stored once for good during manufacture of the transponder, is read. Thus, depending upon the response received or the absence of any response, the reader can check whether the transponder is working properly and can do so in a reliable manner. Advantageously, the reader can carry out a more specific diagnostic whether the received response is legible or not. Thus, if the response is legible and correct, the reader concludes that the transponder is operating normally. If the response is legible but incorrect, the reader concludes that the transponder logic is operating but that the memory content is corrupted. Finally, if the response is illegible or in the total absence of any response, the reader concludes that the transponder assembly is no longer working properly.

Figure 3:
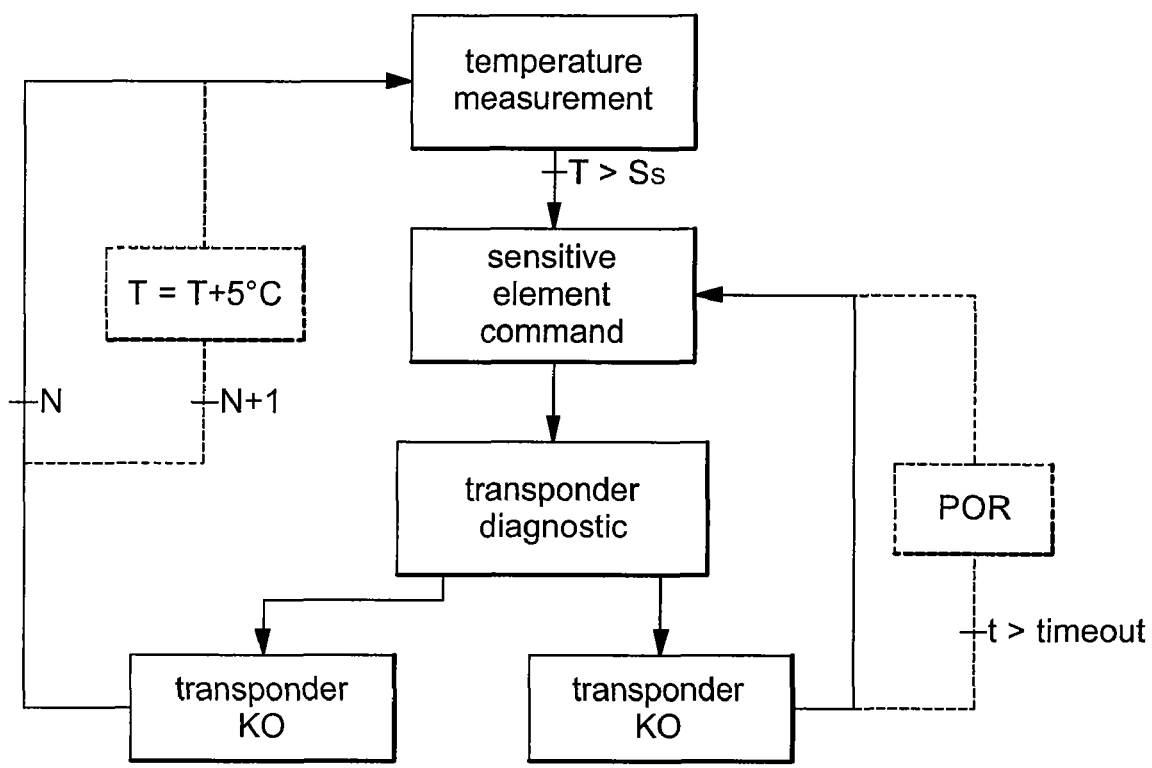
FIG. 3 is a diagram of the various steps of the transponder verification method according to a second implementation variant.

FIG. 3 shows a diagram of the various steps of the transponder verification method according to a second implementation variant. This second variant concerns in particular the recurrence of the diagnostic procedure according to the various possible results. Thus, all of the steps described in relation to FIG. 2 are shown again, including the temperature measurement by means of the temperature sensor, detection of the breach of a overheat threshold, execution of a command on a sensitive element of the transponder, preferably a read command of the identifier stored in the non-volatile memory of the transponder, and making a diagnostic as to the proper working of the transponder as a function of the response received or the absence of any response. All of the alternatives described in relation to FIG. 2 are of course applicable within the scope of this second variant given with reference to FIG. 3.

When the transponder diagnostic made by the reader mentions that the transponder is working properly, the system takes a new temperature measurement in order to ensure that the temperature has dropped back below the overheat threshold. If the measured temperature is still higher than the overheat threshold, a new diagnostic procedure is undertaken. The system then starts the same diagnostic procedure again until the temperature has dropped below the overheat threshold. Alternatively, according to a preferred variant, the procedure is restarted N times preferably with N=3, then if the temperature remains higher than the overheat threshold and the transponder is still operating properly; then the overheat threshold is raised to a higher value, for example for an initial overheat threshold of 125° C., the threshold is raised by 5° C. to bring it to 130° C., then the procedure is reinitialised with a new temperature measurement compared with the new overheat threshold.

When the transponder diagnostic carried out by the reader mentions that the transponder is not operating properly, either the memory is corrupted or the entire transponder, logic and memory, is no longer operating properly, then the reader carries out new read operations for as long as the response received is not correct. If this situation lasts, it is possible to introduce a timeout, then to cut off the power supply, do power-on-reset, allow the tag to rest, then restart the procedure.

It will be understood that various alterations and/or improvements evident to those skilled in the art could be made to the various implementation variants of the method of verifying the proper working of a transponder following detection of a breach of a overheat threshold described in the present description, without departing from the scope of the invention defined by the annexed claims.

What is claimed is:

1. A method of verifying the proper working of a transponder mounted on a rotating mobile element of a vehicle, wherein the method includes the following steps:
   a) measuring a temperature value of the rotating mobile element by a temperature sensor linked to the transponder;
   b) detecting a breach of an overheat threshold by a reader arranged in the vehicle;
   c) monitoring operation achieved by the reader, wherein the reader is provided to communicate with the transponder by executing a command from the reader to one of the temperature sensitive elements of the transponder; and d) determining by the reader a state of the transponder as a function of response to the command or absence of response to the command:
   (i) if the response is correct, the transponder is operational;
   (ii) if the response is incorrect or in the absence of any response, the transponder is not operational.

2. The verification method according to claim 1, wherein said sensitive element selected is a non-volatile memory of the transponder.

3. The verification method according to claim 2, wherein the command is a read operation of the non-volatile memory.

4. The verification method according to claim 3, wherein the read operation is carried out on a memory zone of which content does not vary and that the reader knows.

5. The verification method according to claim 1, wherein the reader distinguishes two sub-states of the non-operational transponder as a function of an incorrect response or the absence of any response:
   (ii.1) If the response is incorrect but legible to the reader, the logic of the transponder is operational but the non-volatile memory is corrupted;
   (ii.2) If the response is incorrect and illegible to the reader or in the absence of any response, the logic is non-operational and the non-volatile memory is corrupted.

6. The verification method according to claim 1, wherein as a function of the state of the transponder diagnosed at step d), the method further includes the following steps:
   if the transponder is operational (i), a new temperature measurement a) is taken, and if the temperature is less than the overheat threshold, the reader/transponder system returns to a normal operating mode, whereas if the temperature is still higher than the overheat threshold, steps c) and d) are carried out again;
   if the transponder is non-operational, steps c) and d) are carried out again.

7. The verification method according to claim 6, wherein the overheat threshold is increased after three occurrences of step d) where the transponder is operational.

8. The verification method according to claim 6, wherein a timeout is provided, to stop the repetition of steps c) and d) when the transponder is not operational, followed by a reset step and a rest time prior to steps c) and d) being carried out again.

9. The verification method according to claim 1, wherein the temperature measurement step a) is carried out in detection of an emergency stop, activation of a wheel anti-locking system, or activation of an electronic braking distribution system of the vehicle.

10. A tire pressure monitoring system for an automobile vehicle adapted to implement a method of verifying the proper working of a transponder mounted on a rotating mobile element of a vehicle, wherein the method includes the following steps:
   a) measuring of a temperature value of the rotating mobile element by a temperature sensor linked to the transponder;
   b) detecting of a breach of an overheat threshold by a reader arranged in the vehicle;
   c) monitoring operation achieved by the reader, wherein the reader is provided to communicate with the transponder by executing a command from the reader to one of the temperature sensitive elements of the transponder; and
   d) determining by the reader a state of the transponder as a function of response to the command or absence of response to the command:
      (i) if the response is correct, the transponder is operational;
      (ii) if the response is incorrect or in the absence of any response, the transponder is not operational,
   wherein the transponder is provided with a pressure sensor for checking a pressure of a tire associated with the rotating mobile element on which the transponder is mounted.

* * * * *